United States Patent Office 3,324,607
Patented June 13, 1967

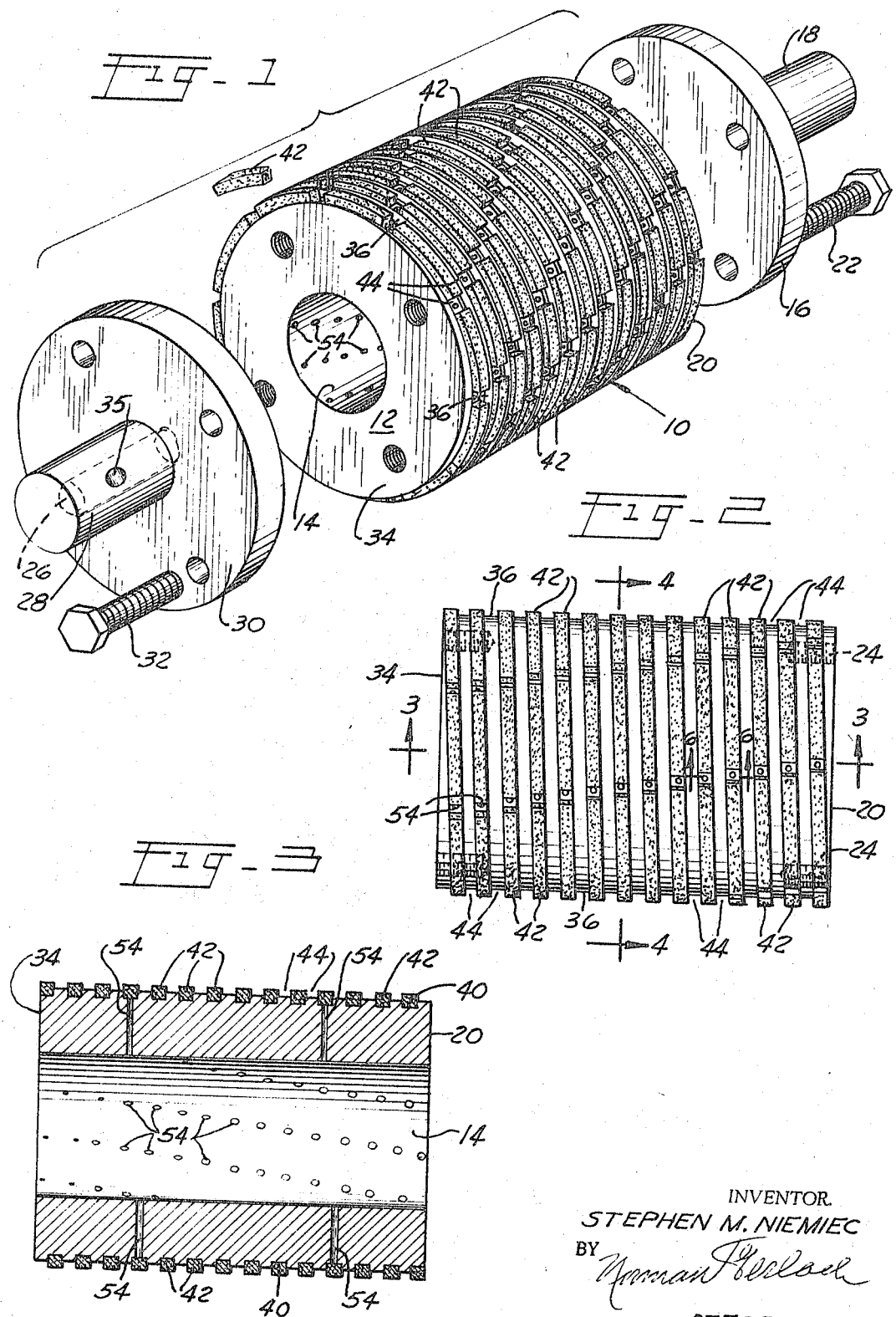

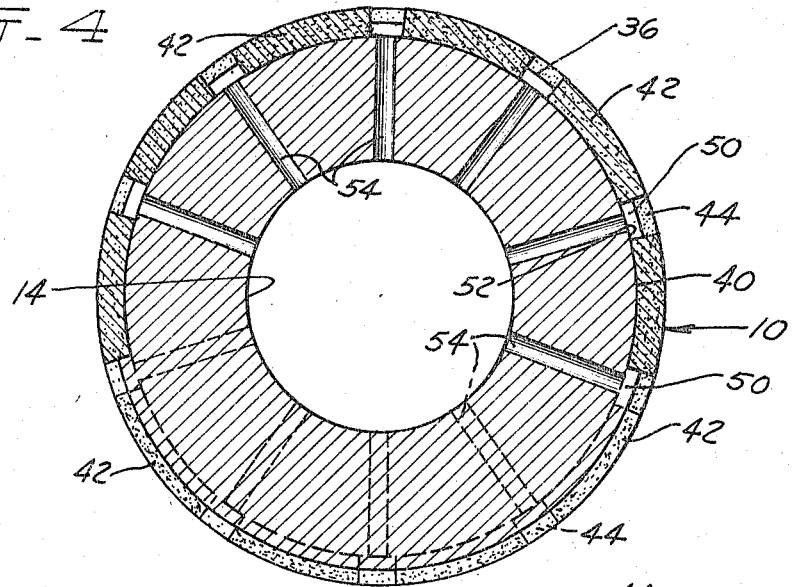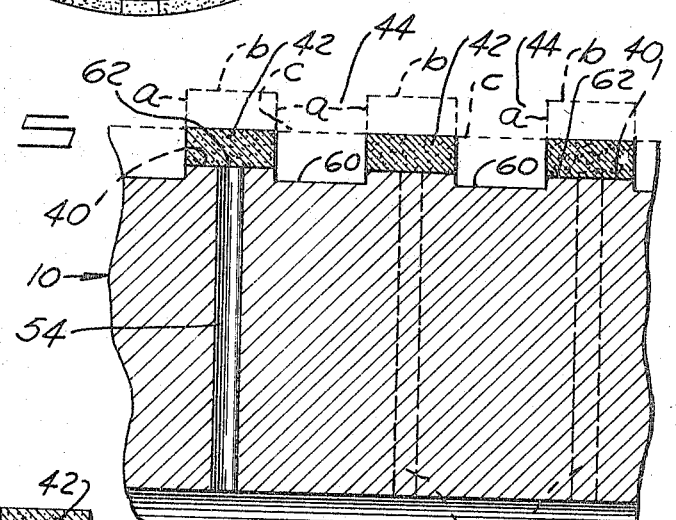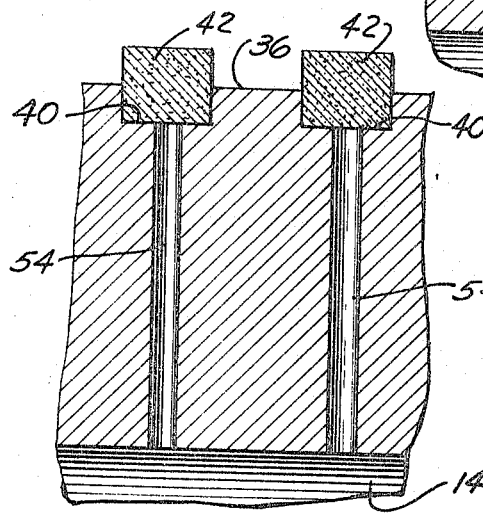

3,324,607
ROTARY GRINDING TOOL WITH INTERRUPTED ABRASIVE HELICOID
Stephen M. Niemiec, Chicago, Ill., assignor to Super-Cut, Inc., Chicago, Ill., a corporation of Illinois
Filed Aug. 13, 1964, Ser. No. 389,319
1 Claim. (Cl. 51—356)

The present invention relates to a grinding tool for surfacing refractory materials such as concrete, marble, granite and the like, and has particular reference to a generally cylindrical rotary tool having an interrupted abrasive helicoid, the tool being adapted for use in a grinding machine whereby relative traversing motion between the tool and the work undergoing surfacing may be effected. The grinding tool of the present invention is adapted for use in connection with a wide variety of commercially available grinding machines whether they be of the type wherein the grinding tool remains stationary and the work is caused repeatedly to traverse the grinding tool, or whether the work remains stationary and the grinding tool is caused repeatedly to traverse the work. The present grinding tool is also useful in connection with tractionally-driven or tractor-drawn vehicle type grinding machines such as are commonly employed for surfacing concrete roadways, aircraft landing fields, and other areaways. Irrespective, however, of the particular use to which the present grinding tool may be put, the essential features thereof are at all times preserved.

In the construction of grinding and cutting tools, especially rotary segmental stone cutting saws, it has long been the practice to employ for stone cutting purposes a series of peripheral, circumferentially-spaced segments in the form of metallic matrices with crushed or fragmented diamond particles distributed throughout the same. These segments are applied to the periphery of the body of the tool by a soldering, brazing or similar operation involving the application of heat. Spacing of the segments in a circular row or rows is resorted to in order to attain better cutting action, especially when a liquid coolant is employed, the spaces between adjacent segments affording sludge collection pockets and greatly enhancing the flushing action during the grinding or cutting operation.

Whether the tool be a comparatively wide grinding wheel or a narrow saw blade, application of the abrasive segments to the tool body is an arduous task and requires careful positioning of the segments, one by one, on the periphery of the body, followed by immediate soldering or brazing thereof in position. The abrasive segments are in the form of elongated hexahedrons which are rectangular in cross section and proper circumferential spacing thereof on the tool body in end-to-end relationship is readily accomplished by the simple expedient of taking measurements, usually requiring only the positioning of one end of a temporary spacer against the end of a previously applied segment so that the next segment may be placed against the other end of the spacer and the proper distance attained. Longitudinal spacing of segments on a cylindrical tool body is, however, extremely difficult since it is hampered by the presence of adjacent closely spaced segments which hamper manual operations such as the application of the solder or brazing materials and the application of the soldering torch or other heat-applying device.

The present invention contemplates the provision of a comparatively wide grinding tool including a cylindrical tool body having spaced abrasive segments mounted on the generally cylindrical surface thereof, the segments being arranged in a continuous helical row of short pitch, the axes of the elongated segments extending in the direction of the helix path or wind, and the pitch being sufficiently short that, despite the elongation of the segments, several successive segments will sweep over a given fixed point on a surface undergoing grinding before a given helix thread will shift laterally from the point. The tool during drive or rotation is designed for fore-and-aft traverse, as distinguished from endwise movement, and thus, during any given traverse operation in either direction, all points on the surface of the slab or other work undergoing grinding are operated upon in abrasive overlap fashion so that a continuously smooth surface will result. The grinding tool of the present invention is thus essentially a finish grinding tool.

It will be appreciated that the manual application of abrasive segments to a generally cylindrical tool body to produce an interrupted abrasive helicoid such as has been briefly outlined above presents difficulties both in segment location and segment application or affixing, which difficulties are considerably greater than those which arise in connection with the application of such segments to a tool body in a circular row or rows. Whereas numerous assembly jigs for applying segments to tool bodies in circular rows are available, the design of an assembly jig which will facilitate the application of the segments one by one successively to the surface of a cylindrical body remains yet to be devised. The method of the present invention obviates the need for an assembly jig in the helical placement of the abrasive segments and, accordingly, it contemplates the helical grooving of the body prior to application of the segments and the subsequent setting of the segments into the continuous helical groove thus formed and in their proper spaced relationship. Thus, no attention whatsoever need be given to lateral spacing of the segments and a simple spacer device may repeatedly be employed in the usual manner of segment mounting for attaining proper circumferential spacing of the segments in the continuous groove. By selecting a proper segment length and circumferential spacing, any desired pattern of abrasive segments on the surface of the cylindrical body may be attained. According to the present invention, segment width is made substantially equal to groove width, while segment height is made appreciably greater than groove depth. The segments thus fit snugly within the helical groove and afford increased soldering or brazing areas, while the segments project radially outwardly beyond the surface of the body an appreciable distance so that the original tool is possessed of an appreciably long life.

By an arrangement such as has been briefly outlined above, not only is the tool possessed of relatively long initial effective usefulness, but the tool is capable of being regrooved after its initial effective usefulness has been lost. After the abrasive segments have been worn flush with the ribs between grooves in the cylindrical body, the tool may then be regrooved and the tool thus given an extended period of usefulness. The regrooving is accomplished by cutting a second continuous helical groove between the adjacent worn convolutions that are established by the abrasive segments and the depth of the second groove is at least sufficiently great as to extend to, and preferably below, i.e., radially inwardly of, the bottom surfaces of the worn segments. In this manner, the unused portions of the segments are made available for further abrasive use and the tool may then be used until the segments have been entirely consumed.

Novel means are provided for supplying a liquid coolant to the work area, this means assuming the form of a series of radial coolant passages which communicate with the bottom of the helical groove at the regions thereof in between adjacent abrasive segments. These passages all communicate with a central bore which extends axially through the cylindrical tool body. The passages are formed by the simple expedient of drilling a series of radial bores through the wall of the tool body either before or after the segments have been mounted thereon.

The provision of a rotary cylindrical grinding tool of the character briefly outlined above and possessing the stated advantages being the principal object of the invention, other objects and advantages will readily suggest themselves as the following description ensues.

In the accompanying two sheets of drawings forming a part of this specification, one illustrative embodiment of the invention has been shown.

In these drawings:

FIG. 1 is an exploded perspective view of a rotary cylindrical grinding tool embodying the principles of the present invention, certain abrasive segments being removed from the tool body in order more clearly to reveal the nature of the invention;

FIG. 2 is a side elevational view of the tool;

FIG. 3 is a longitudinal sectional view taken substantially along the line 3—3 of FIG. 2;

FIG. 4 is a sectional view taken substantially along the line 4—4 of FIG. 2;

FIG. 5 is an enlarged fragmentary sectional view taken substantially longitudinally through a portion of the grinding tool after certain reconditioning grooving operations on the tool body have been effected; and FIG. 6 is an enlarged fragmentary sectional view taken substantially along the line 6—6 of FIG. 2.

Referring now to the drawings in detail and in particular to FIG. 1, the grinding tool of the present invention involves in its general organization a generally cylindrical open-ended tubular tool body 10, the cylindrical wall 12 of which is relatively thick, its radial dimension being approximately one quarter of the diameter of the body. A central axial bore 14 extends through the tool body 10 and one end thereof is closed by means of a relatively thick circular plate 16 from which there projects centrally and outwardly therefrom a trunnion 18. The plate 16 is removably secured to the adjacent end face 20 of the tool body 10 by an annular series of clamping bolts 22 which are threadedly received in sockets 24 (see FIG. 2) in the end face 20 of the tool body. The other end of the bore 14 communicates with an axial passage 26 in a trunnion 28 which extends centrally from a circular plate 30 which is removably secured by clamping bolts 32 to the other end face 34 of the tool body 10. The trunnions 18 and 28 are adapted to be rotatably journalled in suitable bearings (not shown) in associated relation with the grinding head of the particular grinding machine with which the grinding tool is associated; and a suitable liquid coolant, such, for example, as water, is adapted to be supplied to the interior of the tool body by means of a suitable adapter fitting (not shown) which encompasses a radial passage 35. The latter is formed in the trunnion 28 and communicates with the axial passage 26.

The outer cylindrical surface 36 of the tool body 10 is provided with a helical square cut groove 40 (see FIGS. 3 and 6), such groove being continuous from one end of the tool body to the other and of relatively short pitch. A helical series of abrasive segments 42 is disposed and fixedly mounted in the groove, these segments being in the form of metal matrices throughout which there are uniformly distributed quantities of crushed or fragmented diamonds. The segments 42 are of elongated rectilinear block-like design as shown in the drawings, and are fixedly or rigidly held in place by soldering or brazing in the presence of heat or by way of any suitable bonding material, such, for example, as an epoxy resin. They are rectangular and preferably approximately square in transverse cross section. The segments are arranged in end-to-end relationship and adjacent segments are slightly spaced from each other, the space between adjacent segments being designated by the reference numeral 44 (see FIG. 4). The width of each segment is approximately equal to or slightly less than the width of the groove 40 so that when the segments are placed within the groove, they are maintained in helical alignment and with a very close tolerance. The depth of the groove 40 is equal to approximately one-half the radial dimension of the abrasive segments 42 so that the segments have approximately one-half of their mass projecting radially outwardly beyond the cylindrical surface 36 and approximately one-half "embedded" or disposed within the confines of such cylindrical surface.

While the segments 42 are illustrated herein as being fashioned so that they are slightly curved in order accurately to fit the curvature of the bottom of the groove 40, it is not essential that they be thus curved inasmuch as the segments are brazed or soldered within the groove and the brazing or soldering material completely fills any voids which may exist due to the tangency of the segments with respect to the groove bottom.

Neither the length of the segments 42 nor the spacing which is maintained between adjacent segments is particularly critical, but in the illustrated embodiment of the invention, the spacing between adjacent segments is approximately equal to the thickness of a segment, while the length of the segments is such that ten spaced segments consume approximately one helix convolution with transversely adjacent segments being slightly offset to create a segment pattern wherein the spaces 44 fall on a helix as best seen in FIGS. 1 and 2.

Because of the fact that the pitch of the helical groove 40 is relatively short, the adjacent or opposed ends of the segments 42 overlap each other in the longitudinal direction of the tool body 10. Any given transverse plane extending through the body will thus intersect more than one of the segments 42, and specifically in the form of the invention illustrated, such a plane may pass through as many as six of the segments as clearly shown in FIG. 4.

As best seen in FIG. 4, the portion of the space 44 which is between each pair of adjacent abrasive segments 42 and lies radially inwardly of the cylindrical surface 36 of the tool body 10 establishes a rectangular pocket 50, the bottom wall 52 of the helical groove 40 constituting the bottom wall of the pocket. Each of these pockets 50 communicates through a radial passage 54 with the central bore 14 so that the liquid coolant which is fed to the interior of the tool body 10 under pressure will issue from the various radial passages 54 when the tool is in operation and exert a flushing action on the sludge which is formed in the vicinity of the region of the work undergoing grinding or abrasion by the segments 42.

The method wherein the continuous groove 40 is initially cut in the originally cylindrical surface 36 of the tool body 10 and the segments 42 are subsequently soldered or brazed in position within the groove affords a means for accurately aligning the segments in their spaced end-to-end relationship and in a substantially uniform helical row. The continuous helical groove thus constitutes a guide for helical alignment or positioning of the segments and the helical rib which results from forming of the groove reinforces the segments against lateral displacement after they have been soldered or brazed in proper position on the groove 40.

In operation upon a stone or other refractory slab, the head which rotatably supports the grinding tool is caused to traverse the slab, either by moving the head or the slab in the usual manner of effecting grinding machine traverse operations, the direction of traverse being fore-and-aft as in the case of a rotary sweeper and as distinguished from endwise movement. The direction of rotation of the tool is immaterial. Because of the fact that the segments 42 are disposed in a helical row and because, as best seen in FIG. 4, a transverse section through the tool body at any point will intersect several of the segments of the particular helix convolution where the section it taken, every point on the surface undergoing treatment will be abraded by successive segments in the helical row of segments and a smooth or finished abrasive surface devoid of ridges will be attained.

At such time as the various segments 42 have become worn to such an extent that their outer faces coincide with the cylindrical surface 36 of the tool body 10, it is not necessary to discard the tool inasmuch as, according to the present invention, the tool body may be regrooved to expose the "embedded" portions of the segments 42 and the tool again placed in service until such time as the segments have been entirely consumed. In FIG. 5, the dotted lines represent the original outline of a new or fresh tool body 10 with abrasive segments thereon. The dotted lines *a* represent the side faces of the original segments, while the dotted lines *b* represent the outer abrading faces of the segments. The dotted lines *c* represent the crests of the original ribs or ridges which existed between adjacent grooves 40. Assuming now that the segments 42 have become worn to such an extent that the outer abrasive faces of the segments are flush with the crests of the ribs, in this worn condition of the tool, the same has apparently lost all of its usefulness. The surface thereof is truly cylindrical.

In order to recondition the tool and thus extend its usefulness to an extent commensurate with the amount of diamond-containing matrix material remaining on the tool body 10, the cylindrical surface 36 of the body is now regrooved in a helical path in between adjacent worn segments 42, the regrooving taking place to a depth at least equal to the depth of the original groove 40 and preferably to a depth slightly greater than the depth of the original groove. Such a groove is shown in FIG. 5 and is designated by the reference numeral 60. The cutting of the groove 60 serves to remove all of the material which exists between the adjacent segments in adjacent helix convolutions. After the regrooving operation has been completed, the worn segments are left standing on ribs or ridges 62 which exist between adjacent convolutions of the groove 60 and these partially worn segments are thus exposed for further abrasive use in a manner similar to that described in connection with the use of the original tool.

When the thus reconditioned tool is in use, the various coolant passages will supply coolant to the spaces 44 between adjacent segments as heretofore described.

The invention is not to be limited to the exact arrangement of parts shown in the accompanying drawings or described in this specification as various changes in the details of construction may be resorted to without departing from the spirit or scope of the invention. For example, whereas the tool body has been shown and described herein as being generally cylindrical, it is within the purview of the present invention to fashion the same with a slight taper, in which case the continuous groove in the curved outer surface thereof will have an involute spiral component imposed upon its helical extent. Such a tool may be employed as a honing or reaming tool. In the specification and following claims, it will be understood that the phrase "generally cylindrical" is intended to cover a tapered or frusto-conical tool body. Therefore, only insofar as the invention has particularly been pointed out in the accompanying claim is the same to be limited.

Having thus described the invention what I claim as new and desire to secure by Letters Patent is:

A rotary tool of the character described and comprising a generally hollow, thick-walled, open-ended tool body, the outer cylindrical surface of which is provided therein with a continuous square-cut helical groove of short pitch and extending from one end of the body to the other, and a series of elongated abrasive segments of rectangular cross section and fitting snugly and bonded within said groove so as substantially to fill the same except for the interstices between adjacent segments, and likewise extending from one end of the body to the other, said segments projecting radially beyond said cylindrical surface and being arranged in a helical row in spaced end-to-end relationship, the pitch of the helical groove, the number of segments in each helix turn of the groove, and the length of the segments being such that at least three successive segments in the helical row are intersected by any transverse plane of the wheel body, said segments being so disposed within the helical groove that the segments are staggered in the longitudinal direction of the wheel body in order to define a pattern of segment placement wherein the segments are arranged in helical rows of long pitch with the interstices between adjacent segments and in adjacent helix turns lying close to each other, the cylindrical wall of said tool body being formed therein with a series of radially extending coolant passages communicating with the interior of the hollow tool body for conducting a liquid coolant from the interior of the body to the surface region thereof, the outer ends of said passages opening into said helical groove at regions in between the adjacent opposed ends of adjacent segments.

References Cited

UNITED STATES PATENTS

| | | | |
|---|---|---|---|
| 1,604,943 | 10/1926 | Larsson | 51—206.4 |
| 1,633,958 | 6/1927 | Schrott | 51—206.5 |
| 1,687,661 | 10/1928 | Eaton | 51—206.5 |
| 1,949,513 | 3/1934 | Greenwood | 51—206.5 |
| 2,359,920 | 10/1944 | Keeleric | 51—309 |
| 2,769,286 | 11/1956 | Beth | 51—206.4 |
| 3,146,561 | 9/1964 | Lindblad | 51—206.4 |

FOREIGN PATENTS

| | | |
|---|---|---|
| 120,800 | 11/1918 | Great Britain. |

ROBERT C. RIORDON, *Primary Examiner.*

D. G. KELLY, *Assistant Examiner.*